United States Patent [19]

Blount

[11] Patent Number: 4,743,624

[45] Date of Patent: May 10, 1988

[54] PROCESS FOR THE PRODUCTION OF FLAME-RETARDANT POLYURETHANE PRODUCTS

[76] Inventor: David H. Blount, 6728 Del Cerro Blvd., San Diego, Calif. 92120

[21] Appl. No.: 60,492

[22] Filed: Jun. 11, 1987

[51] Int. Cl.$^4$ ............................................. C08J 9/00
[52] U.S. Cl. .................................... 521/106; 521/107; 521/108; 521/119; 521/131; 521/132; 521/154
[58] Field of Search ............. 521/106, 107, 108, 119, 521/131, 132, 154

[56] References Cited

U.S. PATENT DOCUMENTS

| | | | |
|---|---|---|---|
| 4,247,657 | 1/1981 | Blount | 521/175 |
| 4,313,857 | 2/1982 | Blount | 521/110 |
| 4,314,916 | 2/1982 | Blount | 521/110 |
| 4,377,674 | 3/1983 | Blount | 521/154 |

*Primary Examiner*—Morton Foelak

[57] ABSTRACT

Flame-retardant polyurethane products are produced by mixing and reacting a basic salt-forming compound with an acidic salt-forming compound containing phosphorus and/or halogen compounds in a polyol and/or a polyisocyanate, then reacting the polyol and polyisocyanate.

The flame-retardant polyurethane products may be used for thermal and sound insulation, as a coating agent, as an adhesive. for caulking, for cushioning and for molding useful objects.

12 Claims, No Drawings

PROCESS FOR THE PRODUCTION OF FLAME-RETARDANT POLYURETHANE PRODUCTS

BACKGROUND OF THE INVENTION

This invention relates to a process for the production of flame-retardant polyurethane products by reacting salt-forming compounds in a polyol and/or a polyisocyanate, then reacting the polyol and polyisocyanate.

The production of polyurethane products is well known in the Arts and many types of flame-retardant chemicals have been used in the process. It is also known in the Arts that salts of phosphoric acid are useful as a flame-retardant, but when added to the polyurethane products, they take a large amount to do any good as a flame-retardant; therefore, they are not very useful. In the novel process of this invention, only a small amount of salts of phosphorus and-or halogen salts are necessary to produce a flame-retardant product because the molecules of the salts are small and very well distributed throughout the product. In the process of this invention, low-cost and readily available compounds are utilized and there is an improvement in the cost of the product, in the amount of flame-retardant needed, and in the production of inexpensive flame-retardant compounds.

While not wishing to be bound by any theory of operation, it appears that there may also be some reaction of the salt-forming compounds with the polyol or polyisocyanate to give a much better and more stable distribution of salts, thereby proving flame-retardant properties. Any excess of basic salt-forming compounds may be used as a filler or may be a reactant in the process. It takes an amount at least 5 to 10 times more when the salt of phosphorus-containing compound is added to the reactive mixture to produce polyurethane products than it does when the salt is produced as outlined in this invention. The flame-retardant salt produced by the process of this invention is less expensive and at least equal to, or better than, the commercially available flame-retardant agents for polyurethane products in flame-retardant properties.

SUMMARY OF THE INVENTION

Accordingly, the present invention process for the production of flame-retardant polyurethane products in which a first component is admixed with the active hydrogen-containing component or the polyisocyanate component, then a second component is admixed and reacted to form a salt which is well distributed in the form of very small particles. The component containing the active hydrogen and the polyisocyanate are admixed, thereby producing a flame-retardant polyurethane product.

The polyurethane products may contain as little as 1 percent of phosphorus-containing compound such as phosphoric acid and have good flame-retardant properties. The amount of phosphorus and/or halogen-containing compound that would normally be used ranges from 2 percent to 10 percent of the reactive mixture to produce polyurethane products. Halogenated salt product may also be produced by this process and produce flame-retardant polyurethane products. As a general rule, the halogen-containing salt compounds are not as good as the phosphorus-containing compound and it is preferred to use them together. It is also preferable to react a halogen-containing compound with polyvalent basic compounds.

When the pH is lowered by the addition of salt-forming compounds, it may be necessary to add additional basic compounds to bring the pH back to the desired level in order to produce good products. Alkali metal compounds may be used for this purpose, e.g., sodium hydroxide, potassium hydroxide, sodium carbonate, potassium carbonate, sodium silicate, sodium citrate, etc.

DETAILED DESCRIPTION

The flame-retardant compound utilized in this invention is produced by the reaction of a compound containing a radical that will react with a phosphorus or phosphorus-containing compound and/or a halogen or halogen-containing compound in the presence of an organic component, e.g., polyol, polyisocyanate, liquid organic blowing agent, liquid organic additives, to produce the flame-retardant salt.

The salt produced by the reaction of a phosphorus-containing compound and a basic salt-forming compound is preferred. A few of the halogen salts are good flame-retardants, but it is preferable to utilize them with salt-containing phosphorus compounds. Phosphoric acid is the preferred phosphoric compound to be reacted with a basic compound. When a foam contains more than 2 percent of phosphoric acid which has been reacted with a basic compound in a polyol, then reacted with an aromatic polyisocyanate, it is a self-extinguishing foam except in the very light flexible foams produced with tolylene diisocyanates. In order to make the light flexible polyurethanen foams flame-retardant, it is necessary to use 6 percent to 10 percent of the phosphoric acid based on weight of the foam, and in some cases, it is necessary to add other commercially available flame-retardant agents. In rigid foam where aromatic polyurethanes are used, much less flame-retardant agent is necessary.

Flame-retardant polyurethane products may be produced by admixing the following components:

(A) A compound that will react with a phosphorus or halogen compound to form a salt;
(B) A phosphorus- or halogen-containing compound that will react with component A to form a salt;
(C) An active hydrogen-containing compound that will react with an isocyanate radical;
(D) A compound containing 2 or more isocyanate radicals.

COMPONENT A

Any suitable compound that will react with a phosphorus or halogen compound to form a salt may be used in this invention. Suitable compounds include alkali metal compounds, alkaline earth metal compounds, metal compounds, ammonium compounds and mixtures thereof. These compounds are preferable in a fine powder form. An excess amount of these compounds may be used and utilized as a reactant and filler. It is preferable to use natural mineral products when available, to reduce the cost. Salts of acids stronger than phosphoric acid are not suitable.

Suitable alkali metal compounds include compounds which contain sodium, potassium, lithium, rubidium and cesium. These compounds may be in the form of alkali metal, but are not limited to metal oxides, hydroxide, carbonates, salts of organic acids, bicarbonates, natural minerals, silicates, etc.

Suitable alkalin earth metal compounds and mixtures thereof include compounds which contain calcium, strontium, magnesium and barium. These compounds may be in the form of alkaline earth metal, but not limited to metals, oxides, hydroxides, carbonates, salts of organic acids, natural minerals, silicates, etc., and mixtures thereof.

Suitable metal compounds include compounds which contain beryllium, copper, zinc, titanium, zirconium, lead, arsenic, antimony, bismuth, molybdenum, tungsten, manganese, iron, nickel and cobalt. Suitable metal compounds include, but are not limited to, metals, oxides, hydroxides, carbonates, salts of organic acids, natural minerals, silicates, etc., and mixtures thereof.

Suitable ammonium compounds include, but are not limited to, compounds which contain ammonium radical, such as ammonia, amino compounds, e.g., urea, alkylureas, dicyandiamide, melamine, guanidine, aminoguanidine; amines, e.g., aliphatic amines, aromatic amines; organic ammonium salts, e.g., ammonium acetate, ammonium oxoalate, etc., ammonium carbonate, quaternary ammonium hydroxide, ammonium silicate, and mixtures thereof.

Salts of sulfuric acid, nitric acid and halide acids are not suitable because they will not react with the phosphorus and halide-containing compounds except the salt contains an active hydrogen, e.g., sodium hydrogen sulfate.

COMPONENT B

Any suitable phosphorus-containing compound that will react with compounds of Component A to produce a salt may be used in this invention. Suitable phosphorus-containing compounds include, but are not limited to, phosphoric acid, phosphinic acid, phosphinous acid, phosphine oxide, phosphorus trichloride, alkylchlorophosphines, organic acid phosphates, phosphorus oxychloride, monoaluminum phosphate, hydrogen-containing salts of phosphoric acid, hypophosphorous acid, and mixtures thereof.

Any halogen-containing compound that will react with compounds of Componant A to produce a salt may be used with a phosphorus-containing compound in this invention. Suitable halogen-containing compounds include, but are not limited to, hydrochloric acid, hydrofluoric acid, hydrobromide acid, hydriodic acid, alkylating agents containing halides, chlorine, bromide, hydrogen chloride, hydrogen bromide and mixtures thereof.

Phosphoric acid is the preferred acidic salt-forming compound.

COMPONENT C

Any suitable compound that contains at least one active hydrogen, preferably 2 or more active hydrogen-containing compounds, that will react with isocyanate radical may be used in this invention.

The organic compounds having reactive hydrogens (Component C) are understood to be not only compounds which contain amino groups, thiol groups or carboxyl groups, but particularly also polyhydroxyl compounds and especially those which contain two to eight hydroxyl groups and which have a molecular weight of about 800 to about 10,000, preferably about 1,000 to about 6,000, e.g., polyesters, polyethers, polythioethers, polyacetals, polycarbonates and polyester amides which contain at least 2, generally 2 to 8 and preferably 2 to 4 hydroxyl groups and at least one ionic or non-ionic hydrophilic group, of the kind which are known per se for producing both homogeneous and cellular polyurethanes.

Any suitable polyesters with at least one hydroxyl group may be used to make Component C, including, e.g., reaction products of polyhydric, preferably dihydric alcohols with the optional addition of trihydric alcohols, and polybasic, preferably dibasic carboxylic acids. Instead of free polycarboxylic acids, the corresponding polycarboxylic acid anhydrides or corresponding polycarboxylic acid esters of lower alcohols or their mixtures may be used for producing the polyesters. The polycarboxylic acids may be aliphatic, cycloaliphatic, aromatic and/or heterocyclic and may be substituted, e.g., with halogen atoms, and/or unsaturated. The following are examples: succinic acid, adipic acid, suberic acid, azelaic acid, sebasic acid, phthalic acid, isophthalic acid, trimellitic acid, phthalicacid anhydride, tetrahydrophthalic acid anhydride, hexahydrophthalic acid anhydride, tetrachlorophthalic acid anhydride, indomethylene tetrahydrophthalic acid anhydride, glutaric acid anhydride, maleic acid, maleic acid anhydride, fumaric acid, simeric and trimeric fatty acids such as oleic acid, optionally mixed with monomeric fatty acids, dimethyl terephthalate and bis-glycol terephthalate. Suitable polyhydric alcohols include, e.g., ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxymethyl cyclohexane). 2-methyl-1,3-propanediol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl groups in end positions. Polyesters of lactones such as $\epsilon$-caprolactone or hydroxycarboxylic acids such as $\omega$-hydroxycaproic acid may also be used.

Any suitable hydroxyl polyether with at least one, generally two to eight and preferably two to three hydroxyl groups which may be used to make Component C according to the invention are also known per se and may be prepared, e.g., by polymerizing epoxides such as ethylene oxide, propylene oxide, butylene oxide, tetrahydrofuran, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol, propylene glycol-(1,3) or -(1,2), trimethylolpropane, 4,4'-dihydroxy-diphenylpropane, aniline, ammonia, ethanolamine, or ethylene diamine, Sucrose polyethers such as those described, e.g., in German Auslegeschrift Nos. 1,176,358 and 1,064,938 may also be used according to the invention. It is frequently preferred to use polyethers which contain predominantly primary OH-groups (up to 90% by weight, based on all the OH-groups in the polyether). Polyethers modified with vinyl polymers of the kind which can be obtained, e.g., by polymerizing styrene or acrylonitrile in the presence of polyethers (U.S. Pat. Nos. 3,383,351; 3,304,273; 3,523,092 and 3,110,695 and German patent specification No. 1,152,536), and polybutadienes which contain OH-groups are also suitable.

Suitable polythioethers are in particular the condensation products of thiodiglycol with itself and/or with other glycols, dicarboxylic acids, formaldehyde, aminocarboxylic acids or amino alcohols. The products obtained are polythiomixed ethers, polythioether esters or polythioether ester amides, depending on the co-component.

Suitable polyacetals are, e.g., the compounds which can be prepared from glycols such as diethylene glycol, triethylene glycol, 4,4'-dioxethoxy-diphenyl dimethylmethane, hexanediol and formaldehyde, polyacetals suitable for the invention may also be prepared by polymerizing cyclic acetals.

Suitable polycarbonates with hydroxyl groups are of the kind known per se which can be obtained, e.g., by reacting diols such as propane-1,3-diol, butane-1,4-diol and/or hexane-1,6-diol or diethylene glycol, triethylene glycol or tetraethylene glycol with diaryl carbonates such as diphenyl carbonate or phosgene.

The polyester amides and polyamides also include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups may also be used, as well as modified or unmodified natural polyols such as castor oil, carbohydrates or starch. Additional products of alkylene oxides to phenol-formaldehyde resins or to urea-formaldehyde resins may also be used according to the invention.

Representatives of these compounds which may be used according to the invention have been described, e.g., in High Polymers, Volume XVI, "Polyurethanes, Chemistry and Technology" published by Saunders-Frisch, Interscience Publishers, New York, London, Volume I, 1962, pages 32–42 and pages 44–54 and Volume II, 1964, pages 5–6 and 198–199 and in Kunststoff-Handbuch Volume VII, Vieweg-Hochtlen, Carl-Hanser-Verlag, Munich, 1966, e.g., on pages 45 to 71.

Silicone compounds which contain free hydroxyl or amine groups may be used in this invention, e.g., silicone polyols.

COMPONENT D

Any suitable compound that contains at least 2 isocyanate groups may be used in this invention.

Any suitable organic polyisocyanate may be used as starting Component A, including aliphatic, cycloaliphatic, araliphatic, aromatic or heterocyclic polyisocyanates of the kind described, e.g., by W. Siefken in Justus Liebigs Annalen der Chemie, 562, pages 75 to 136, for example ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and 1,4-diisocyanate and any mixtures of these isomers, 1-isocyanato-3,3,5-trimethyl-5-isocyanatomethyl-cyclohexane (DAS No. 1,202,785), hexahydrotolylene-2,4- and -2,6-diisocyanate and any mixtures of these isomers, hexahydrophenylene-1,3- and/or -1,4-diisocyanate, perhydrodiphenylmethane-2,4'- and/or 4,4'-diisocyanate, phenyl-1,3- and -1,4-diisocyanate, tolylene-2,4- and -2,6-diisocyanate and any mixtures of these isomers, diphenylmethane 2,4'- and/or -4,4'-diisocyanate, naphthylene-1,5-diisocyanate, triphenylmethane-4,4',4''-triisocyanate, polyphenyl-polymethylene-polyisocyanates, which can be obtained by aniline-formaldehyde condensation followed by phosgenation and which have been described, e.g., in British patent specification Nos. 874,430 and 848,671, perchlorinated aryl polyisocyanates as described, e.g., in U.S. Pat. No. 3,277,138, polyisocyanates which contain carbodiimide groups as described in U.S. Pat. No. 3,152,162, diisocyanates of the kind described in U.S. Pat. No. 3,492,330, polyisocyanates which contain allophanate groups as described, e.g., in British patent specification No. 994,890, Belgian patent specification No. 761,626 and published Dutch patent application No. 7,102,524, polyisocyanates which contain isocyanurate groups as described, e.g., in German patent specification Nos. 1,022,789; 1,222,067 and 1,027,394 and in German Offenlegungsschrift Nos. 1,929,034 and 2,004,048, polyisocyanates which contain urethane groups as described, e.g., in Belgian patent specification No. 752,261 or in U.S. Pat. No. 3,392,164, polyisocyanates which contain acylated urea groups according to U.S. Pat. No. 3,517,039, polyisocyanates which contain biuret groups as described, e.g., in U.S. Pat. No. 3,124,605, in British patent specification No. 889,050 and in U.S. patent application Ser. No. 036,500 filed May 11, 1970, now abandoned, polyisocyanates prepared by telomerization reactions as described, e.g., in Belgian patent specification No. 723,640, polyisocyanates which contain ester groups of the kind mentioned, e.g., in British patent specification Nos. 956,474 and 1,072,956, in U.S. Pat. No. 3,567,763 and in German patent specification No. 1,231,688, and reaction products of the above-mentioned isocyanates with acetals according to U.S. Pat. No. 3,120,502.

The distillation residues which are obtained from the commercial production of isocyanates and which still contain isocyanate groups may also be used, if desired, dissolved in one or more of the above-mentioned polyisocyanates. Any mixtures of the above-mentioned polyisocyanates may also be used.

It is generally preferred to use commercially readily available polyisocyanates such as tolylene-2,4- and -2,6-diisocyanate and any mixtures of these isomers ("TDI"), polyphenyl-polymethylene polyisocyanates which are obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

It is particularly preferred, however, to use polyisocyanates which are obtained by phosgenating aniline-formaldehyde condensates.

Reaction products of about 50 to 99 mols of aromatic diisocyanates with about 1 to 50 mols of compounds which contain at least 2 hydrogen atoms capable of reacting with isocyanate and which generally have a molecular weight of about 400 to about 10,000 may also be used.

The flame-retardant polyurethane products may be produced under any suitable physical condition. The components may be mixed in any suitable manner. They may be mixed simultaneously or Components A and B may be mixed with Component C and/or Component D. It is preferable to mix Components A and B in Component C and react A and B, then mix with Component D at ambient temperature and pressure. The optional component may be added to the mixture of A, B and C before adding Component D. Optional components include initiator, filler, dilutent, blowing agent, emulsifying agent, foam stabilizer, modifying compounds, etc.

The proportions of the reactants and other compounds used in this invention may vary within the following ratios:
 (a) 1 to 300 parts by weight of Component A;
 (b) 1 to 50 parts by weight of Component B;
 (c) 1 to 200 parts by weight of Component C;
 (d) 50 to 100 parts by weight of Component D:
 (e) Up to 50 percent by weight of an inert liquid, boiling in the range of −25° C. to 80° C.;
 (f) Up to 10 percent by weight of activator;
 (g) Up to 20 percent by weight of foam stabilizer;
 (h) Up to 20 percent by weight of emulsifying agent;
 (i) Up to 300 percent by weight of inorganic or organic particulate or pulverulent material;
 (j) Up to 300 percent of a modifying compound.
Percentages are based on weight of the reaction mixture.

When producing foams by the process according to the invention, it is advisable to use blowing agents, even when using NCO-prepolymers which give rise to the evolution of carbon dioxide. The blowing agents which are suitable for this purpose are inert liquids boiling within a range of −25° C. to +80° C. and preferably −15° C. to +40° C. They are preferably insoluble in the silicate solution and they are used in quantities of 0–50 percent by weight, preferably 2–30 percent by weight, based on the reaction mixture.

Suitable organic blowing agents are, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g., on pages 108 and 109, 453 to 455 and 507 to 510.

Catalysts which promote the reaction of isocyanates with reactive hydrogen are also often used according to the invention in catalytic amounts. Catalysts known per se may be used, e.g., tertiary amines such as trieyhylamine, tributylamine, N-methyl-morpholine, N-ethylmorpholine, N-cocomorpholine, N,N,N',N'-tetramethylethylene diamine, 1,4-diaza-bicyclo(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-β-phenyl ethylamine, 1,2-dimethyl imidazole or 2-methyl imidazole.

Suitable tertiary amine catalysts with hydrogen atoms which are reactive with isocyanate groups include, e.g., triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethylaminomethyl-tetramethyl-disiloxane.

Bases which contain nitrogen, such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Organic metal compounds may also be used as catalysts according to the invention, particularly organic tin compounds.

The organic tin compounds used are preferably tin-(II) salts of carboxylic acids such as tin(II)-acetate, tin(II)-octoate, tin(II)-ethyl hexoate and tin(II)-laurate and the dialkyl tin salts of carboxylic acids such as dibutyl tin diacetate, dibutyl tin dilaurate, dibutyl tin maleate or dioctyl tin diacetate.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g., on pages 96 to 102.

The catalysts are generally used in any catalytic amount, preferably in a quantity up to 10 percent by weight, based on the quantity of polyisocyanate.

Surface-active additives (emulsifiers and foam stabilizers) may also be used according to the invention. Suitable emulsifiers include, e.g., the sodium salts of ricinoleic sulphonates or of fatty acids or salts of fatty acids with amines such as oleic acid diethylamine or stearic acid diethanolamine. Alkali metal or ammonium salts of sulphonic acids, for example of dodecyl benzene sulphonic acid or dinaphthyl methane disulphonic acid or of fatty acids such as ricinoleic acid or of polymeric fatty acids may also be included as surface-active additives.

The foam stabilizers used are mainly water-soluble polyether siloxanes. These compounds generally have a polydimethyl siloxane group attached to a copolymer of ethylene oxide and propylene oxide. Foam stabilizers of this kind have been described, e.g., in U.S. Pat. No. 3,629,308.

Reaction retarders, e.g., substances which are acid in reaction such as hydrochloric acid or organic acid halides, cell regulators known per se as paraffins or fatty alcohols or dimethyl polysiloxanes, pigments, dyes, flame-retardant agents known per se such as trischloroethyl phosphate or ammonium phosphate and polyphosphate, stabilizers against aging and weathering, plasticizers, fungistatic and bacteriostatic substances and fillers such as barium sulphate, kieselguhr, carbon black or whiting may also be used according to the invention.

Other examples of surface-active additives, foam stabilizers, cell regulators, reaction retarders, stabilizers, flame-retarding substances, plasticizers, dyes, fillers and fungistatic and bacteriostatic substances which may also be used according to the invention and details concerning their use and mode of action have been described in Kunststoff-Handbuch, Volume VI, published by Vieweg and Hochtlen, Carl-Hanser-Verlag, Munich 1966, e.g., on pages 103 to 113.

Additives which even further improve the fire characteristics of these plastics are particularly important and therefore it is preferred to include them. Apart from the usual flame-retarding agents, these include in particular halogenated paraffins and inorganic salts of phosphoric acid.

Production of foams according to the invention is basically carried out by mixing the above-described reactants in one or several stages in a discontinuously or continuously operating mixing apparatus and then leaving the mixture to foam up and solidify, in most cases outside the mixing apparatus in milds or on suitable supports. The required reaction temperature of between about 0° C. and 200° C., preferably between 30° C. and 160° C., can be achieved either by preheating one or more of the reactants before the mixing process or by heating the mixing apparatus itself or by heating the reaction mixture after it has been prepared. One may, of course, also use combinations of these or other methods for adjusting the reaction temperature. In most cases, sufficient heat is evolved during the reaction to enable the reaction temperature to rise above 50° C. after onset of the reaction or of foaming.

The reactants may, however, also be reacted by the known one-step process, prepolymer process or semi-prepolymer process, often using mechanical devices such as those described in U.S. Pat. No. 2,764,565. Details concerning apparatus which may also be used according to the invention have been described in Kunststoff-Handbuch, Volume VI, published by Vieweg and Hochtlen, Carl-Hanser-Verlag, Munich 1966, e.g., on pages 121 to 205.

Exceptionally high-grade plastics are obtained by the process according to the invention if hardening is carried out at temperatures above 20° C., in particular, 50° C.–200 ° C. So much heat is liberated even without the external supply of heat, especially in combinations of polyisocyanates which contain 10–40 percent of NCO groups. Temperatures above 150° C. are easily reached in the interior of foam blocks.

If the quantity of heat evolved in the reaction between the components is not sufficient, mixing may easily be carried out at a higher temperature, e.g., between 40° C. and 100° C. In special cases, mixing may also be carried out above 100° C., up to about 150° C. under pressure, so that when the material is discharged from the apparatus, the release of pressure is accompanied by foaming.

If production of the foam is carried out at an elevated temperature, one may, of course, also use higher boiling blowing agents such as hexane, dichloroethane, trichloroethane, carbon tetrachloride or light petrol. On the other hand, the water contained in the mixture may take over the function of blowing agent.

Foams may also be produced with the aid of inert gases, particularly air. For example, one of the reactants may be foamed up with air and then mixed with the other components. Mixing of the components may also be achieved, e.g., with the aid of compressed air which results in the direct formation of a foam which then hardens when shaped.

For any given formulation of components, the properties of the foams obtained, e.g., their density in the moist state, depends to some extent on the details of the mixing process such as the nature and speed of the stirrer, the form of the mixing chamber and the selected reaction temperature when foaming is started. This density may vary from about 0.005 to 1.2 g/m$^3$ and in most cases moist fresh foams with densities of between 0.02 and 0.8 g/cm$^3$ are obtained. When dry, the foams may have an open-celled or closed-celled character.

The characteristics of the reaction mixtures provide many possible applications for the process according to the invention and hence many fields of application, some of which will be outlined below.

The reaction mixture which contains blowing agent may, for example, be spread-coated on warm or cold supports or supports exposed to IR or HF radiation, or after passing the mixture apparatus the reaction mixture may be sprayed on these supports with the aid of compressed air or by the airless spraying process. The reaction mixture then foams up on the supports and hardens to form a filling or insulating or moisture proofing coating. The foaming reaction mixture may also be forced, cast or injection-molded into cold or heated molds and in these molds, which may be relief molds, solid molds or hollow molds, it may be left to harden, optionally under pressure and at room temperature or temperatures of up to 200° C., optionally using a centrifugal casting process. At this stage, reinforcing elements in the form of inorganic and/or organic or metal wires, fibers, non-woven webs, foams, fabrics, supporting structures, etc., may be incorporated. This may be achieved, for example, by the fibrous web impregnation process or by processes in which the reaction mixtures and reinforcing fibers are together applied to the mold, for example by means of a spray apparatus. The molded products obtainable in this way may be used as building elements, e.g., in the form of optionally foamed sandwich elements which may be used directly or subsequently laminated with metal, glass, plastics, etc., the good fire characteristics of the material in the moist or dry state being a considerable advantage in these elements. On the other hand, the products may be used as hollow bodies, e.g., as containers for goods which are required to be kept moist or cool, or they may be used as filter materials or exchangers, as catalyst carriers or carriers of other active substances, as decoration elements, furniture components and cavity fillings. They may also be used as heavy-duty lubricants and coolants or carriers of such substances, e.g., in metal extrusion presses. Their use in model and mold building and in the production of molds for metal casting may also be considered.

One preferred method consists of letting the foaming process proceed hand in hand with hardening, for example, by preparing the reaction mixture in a mixing chamber and at the same time adding the readily volatile blowing agent such as dichlorodifluoromethane, trichlorofluoromethane, butane, isobutylene or vinyl chloride so that with suitable choice of the mixing temperature, the reaction mixture foams up on leaving the mixing chamber due to evaporation of the blowing agent and at the same time hardens due to the action of the hardener so that the resulting foam, which may still contain emulsifiers and foam stabilizers and other auxiliary agents, becomes fixed. Furthermore, the reaction mixture which initially is still a thin liquid may be foamed up by introducing gases such as air, methane, CF$_4$ or inert gases, optionally under pressure, this foam being converted into the required form and left to harden, Alternatively, the prepolymer solution which may contain foam stabilizers such as wetting agents, foam-forming agents, emulsifiers and optionally also other organic or inorganic fillers or diluents may be converted into a foam by gasifying it and this foam may then be mixed with the counter components in a mixing apparatus and optionally also with hardener and then left to harden.

Instead of blowing agents, inorganic or organic finely divided hollow particles such as hollow expanded beads of plastics, straw and the like may be used for producing the foams.

The foams obtainable in this way may be used optionally after a compating or tempering process, optionally under pressure, as insulating materials, cavity fillings, packaging materials and building materials which have good solvent resistance and fire characteristics. They may also be used as light-weight building bricks in the form of sandwiches, e.g., with metal covering layers for use in house-building and the construction of motor vehicles and aircraft.

The reaction mixtures may also be foamed up and hardened while in the form of droplets dispersed, e.g., in petroleum hydrocarbons or while they are under conditions of free fall. Foam beads are obtained in this way.

Furthermore, organic and/or inorganic particles which are capable of foaming or have already been foamed, e.g., particles of expanded clay, blown glass, wood, popcorn, cork, hollow beads of plastics such as vinyl chloride polymers, polyethylene, styrene polymers or foam particles of these polymers or of other polymers such as polysulphone, polyepoxide, polyurethane, urea formaldehyde, phenol formaldehyde or polyimide polymers may be incorporated in the foaming reaction mixtures while they are still fluid, or heaps of these particles may be permeated with the reaction mixtures to produce insulating materials which have good fire characteristics.

If the blowing agent which is capable of evaporating or liberating gases below a given temperature, for example a hydrocarbon or halogenated hydrocarbon, is added at this temperature to a mixture of aqueous silicate solutions and hardeners optionally also containing inorganic and/or organic additives, then the resulting mixture, which is at first liquid, may be used not only for producing uniform foams or foams which contain other foamed or unfoamed fillers, but also for permeating woven and non-woven fibrous webs, grids, constructional parts or other permeable structures with foamed material to produce composite foams which have special properties, e.g., advantageous fire characteristics, which may be used directly as constructional elements in the building industry, furniture industry or motor vehicle and aircraft industries.

The foams according to the invention may also be added in a crumbly form to soil, optionally with the addition of fertilizers and plant-protective agents, to improve the agricultural consistency of the soil. Foams which have a high water content may be used as substrates for the propagation of seedlings, shoots and plants or for cut flowers. The mixtures may be sprayed on terrain which is impassible or too loose, such as dunes or marshes, to strengthen such terrain so that it will be firm enough to walk on within a short time and it will be protected against erosion.

The reaction mixtures proposed here are also important in the case of fire or disaster because they can be sprayed on articles which are required to be protected, and the water contained in them cannot run down the surface of the protected article and cannot evaporate rapidly, so that a very effective protection against fire, heat or radiation is obtained since the hardened mixture cannot be heated to temperatures much above 100° C. so long as it still contains water, and it will absorb IR or nuclear radiation.

Since the mixtures can easily be sprayed, they can be used to form effective protective walls and protective layers in mines in the case of accident or also for routine work, for example, by spraying them on fabrics or other surfaces or grids or also simply on walls.

In the same way, the foaming mixtures may also be used in underground and surface engineering and road building, for erecting walls and igloos and for sealing, filling, plastering, priming, insulating and decorating and as coatings, flooring compositions and linings. Their use as adhesives or mortar or casting compounds, optionally with inorganic or organic fillers, may also be considered. They may be charged with active substances or used as catalyst carriers or filters or absorbents.

Auxiliary agents which may be added to the reaction mixture or introduced subsequently, such as emulsifiers, detergent raw materials, dispersing agents, wetting agents, perfumes or substances which render the mixture hydrophobic enable the properties of foams to be modified as desired.

On the other hand, the foams may subsequently be lacquered, metallized, coated, laminated, galvanized, vapor-treated, bonded or flocked. Forming operations may be carried out on the shaped articles in their aqueous or dried state, for example by sawing, cutting, drilling, planing, polishing or other such processes.

The shaped products, with or without filler, may be further modified in their properties by thermal aftertreatment, oxidation processes, heat-pressing, sintering processor or surface melting or other compacting processes.

The molds may suitably be made of inorganic and/or organic foamed or unfoamed material such as metals, e.g., iron, nickel, refined steel or lacquered or tefloncoated aluminum or precelain, glass, gypsum, cement, wood or plastics such as PVC, polyethylene, epoxy resins, polyurethanes, ABS, polycarbonate, etc.

The foams obtained according to the invention may also be subsequently rinsed or impregnated with aqueous or non-aqueous acid, neutral or basic liquids or gases such as hydrochloric acid, phosphoric acid, formic acid, acetic acid, ammonia, amines, organic or inorganic salt solutions, lacquer solutions, solutions of monomers which have been polymerized or are yet to be polymerized, dye solutions, galvanization baths or solutions with catalysts or catalyst precursors or perfumes.

The new composite plastics are also suitable for use as constructional materials because they have a high tensile strength and compression resistance and are tough and stiff and yet elastic and have a high dimensional stability under heat and flame resistance.

The excellent heat-insulating and sound-absorbing capacity of these foams should also be emphasized, properties which in combintion with the excellent fire resistance and heat resistance open up new possibilities of application in the insulating field.

Thus, for example, high-quality light-weight building panels can be produced, either by cutting or sawing continuously foamed blocks or by foaming such panels in milds, optionally under pressure, this molding process being particularly suitable also for complicated shapes. By suitably controlling the operating conditions, it is also possible to obtain molded products which have a dense outer skin.

The process according to the invention is particularly suitable, however, for in situ foaming on the building site. Any hollow molds normally produced by shuttering in forms can be obtained by casting and foaming.

Cavities, joints and cracks can also easily be filled with the reaction mixture, a very firm bond being obtained between the materials which are joined together in this way. The reaction mixtures may also be used to produce insulating indoor plasters simply by spraying.

In many cases, the materials obtained can by used instead of wood or hard fiber board. They can be worked by sawing, grinding, planing, nailing, drilling and cutting and are therefore versatile in their uses and possible applications.

Very brittle light-weight foams which can be obtained, e.g., with very high silicate contents or by using combinations with brittle organo-polymers, can easily be crushed in suitable apparatus to form dust-fine powders which can be used for many purposes as organo-modified silica fillers. The organo-modification insures good surface interaction with polymers and in some cases, also a certain surface thermoplasticity which enables high-quality molding materials to be obtained with which topochemical surface reactions can be carried out by the addition of crosslinking agents.

For many purposes, additional fillers in the form of particulate or pulverulent materials are incorporated in the mixtures of polyisocyanate and organic component.

The fillers may be solid inorganic or organic substances used, e.g., in the form of powder, granulate, wire, fibers, dumb-bell-shaped particles, crystallites, spirals, rods, beads, hollow beads, foam particles, fleeces, woven or knitted fabrics, tapes, foil pieces, etc., for example, dolomite, chalk, clay, asbestos, basic silicic acids, sand, talcum, iron oxide, aluminum oxide and hydroxides, alkali metal silicates, zeolites, mixed silicates, calcium silicates, calcium sulphates, alumino silicates, cements, basalt wool or powder, glass fibers, carbon fibers, graphite, carbon black, Al-, Fe-, Cu- and Ag-powder, molybdenum sulphide, steel wool, bronze of copper fabrics, silicon powder, expanded clay particles, hollow glass beads, glass powder, lava and pumice particles, wood chips, wood meal, cork, cotton, straw, popcorn, coke and particles of filled or unfilled, foamed or unfoamed, stretched or unstretched organic polymers. Among the numerous suitable organic polymers, the following are mentioned as examples, which may be used, e.g., as powders, granulates, foam particles, beads, hollow beads, particles which can be foamed, but have not yet been foamed, fibers, tapes, woven and non-woven webs, etc., polystyrene, polyethylene, polypropylene, polyacrylonitrile, polybutadiene, polyisoprene, polytetrafluoroethylene, aliphatic and aromatic polyesters, malamine urea resins or phenol resins, polyacetal resins, polyepoxides, polyhydantoins, polyureas, polyethers, polyurethanes, polyimides, polyamides, polysulphones, polycarbonates and, of course, any copolymers thereof.

In principle, the composite materials according to the invention may be filled with considerable quantities of fillers without thereby losing their valuable properties. Composite material in which the inorganic component predominates are preferably filled with inorganic fillers to obtain a reinforcing effect while composite materials in which the silicate content predominates are preferably filled with organic fillers. Particularly preferred fillers are chalk, talcum, dolomite, gypsum, clay, anhydrite, glass, carbon and the usual plastics and rubber waste.

Products which have a low filler content are particularly suitable for producing rapidly hardening high-quality surface coatings which have excellent adherence and wear resistance and for producing elastomers with high strength and high modulus. The reactive mixture may be used for producing surface coatings, adhesive bonds, putties and interlayers.

For such applications, it is preferable to use polyisocyanates with a low isocyanate content, e.g., less than 5 percent. The mixtures obtained in this way have a long pot life and can also be applied in thin layers which gradually harden in the course of time.

The materials according to the invention are also suitable for use as finishes for treating fibers in impregnating agents. For this purpose they may be applied either as the finished mixture of organic component and silicate component or as two separate baths. It is therefore preferable first to apply that component which adheres more firmly to the fiber, in other words, the isocyanate component on organic material and the silicate component on inorganic material.

Furthermore, fibers and sheet structures which can be used, e.g., for manufacturing synthetic incombustible paper or for manufacturing non-woven webs may be produced by extruding the mixtures through dies or slots.

Any suitable modifying or additive compounds may be used in the reaction of this invention to vary properties of the product. Typical modifying compounds include polyepoxides, polysulfide polymers, alkali sulfides, aminoplasts, phenoplast, fatty or rosen acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, funed silica, hydrated silica, polysilicic acid, perchloroethylene, benzoate esters, phthalate esters, polyester benzoate, water-binding agents, etc., and mixtures thereof.

The object of the present invention is to provide a novel process of producing flame-retardant polyurethane products. Another object is to produce novel flame-retardant polyurethane products. Another object is to produce novel flame-retardant polyurethane products using small amounts of low-cost flame-retardant agents. Still another object is to produce flame-retardant polyurethane products that may be used for thermal insulation, structural purposes, sound proofing, shock-resistant packaging, cushions, surface coating, adhesives, casting material, putty, etc.

DESCRIPTION OF PREFERRED EMBODIMENTS

My invention will be illustrated in greater detail by the specific examples which follow, it being understood that these preferred embodiments are illustrative of, but not limited to, procedures which may be used in the production of flame-retardant and polyurethane products. Parts and percentages are by weight unless otherwise indicated.

EXAMPLE 1

About 15 parts by weight of an aqueous solution containing 50 percent of phosphoric acid, 30 parts by weight of calcium carbonate powder and 10 parts by weight of a polypropylene triol, mol. wt. 3,000, hydroxyl No. 56, are thoroughly mixed, then agitated while the phosphoric acid and calcium carbonate react, thereby producing carbon dioxide which is released. After about 4 to 6 hours, a stable emulsion is formed containing calcium phosphate, calcium carbonate and polyol. To the emulsion, 1 part by weight of a foam regulator (Dow 190), 0.25 parts by weight of tin octoate and 0.5 parts by weight of triethylamine are added, then the emulsion is mixed with 45 parts by weight of tolylene diisocyanate (TDI by OLIN). The mixture expands to produce a flexible polyurethane foam of about 1 pound per cubic foot.

The foam was flame-tested with a ½-inch flame from a propane torch. The foam slowly burned. The flame traveled superficially with charring and there was a definite decrease in the amount of smoke when compared to burning flexible foam containing no flame-retardant. The first foam was self-extinguishing as soon as a char was formed. It is necessary to add more flame-retardant salts or commercial flame-retardant agent to make light-weight flexible flame-resistant polyurethane foam.

EXAMPLE 2

Example 1 is modified wherein another basic salt-forming compound powder is utilized in place of 50 percent by weight of the calcium carbonate and is selected from the list below, or mixtures thereof. Sodium hydroxide may be added to adjust the pH to the desired pH.

(a) calcium oxide;
(b) calcium hydroxide;
(c) calcium silicate;
(d) diethylenetriamine;
(e) clay;
(f) kaolin;
(g) sodium carbonate;
(h) sodium hydroxide;
(i) sodium oxide;
(j) sodium bicarbonate;
(k) potassium hydroxide;
(l) potassium carbonate;
(m) sodium silicate;
(n) potassium silicate;
(o) lithium silicate;
(p) Portland cement;
(q) aluminium hydroxide;
(r) barium hydroxide;
(s) ferric hydroxide;
(t) cadium hydroxide;
(u) zinc hydroxide;
(v) cupric carbonate;
(w) magnesite ($MgCO_3$);
(x) dolomite ($MgCO_8.CaCO_3$);
(y) mixtures of the above.

EXAMPLE 3

Example 1 is modified wherein polyisocyanate is used in place of tolylene diisocyanate and selected from the group below:
(a) Polymeric MDI (MONDUR MR by MOBAY);
(b) Polymeric MDI (PAPI 27 by UPJOHN);
(c) modified polyisocyanate (MONDUR T-422 by MOBAY);
(d) modified TDI with polyisocyanate (MONDUR MR by MOBAY);
(e) methylene diphenyl isocyanate;
(f) hexamethylene-1,6-diisocyanate.

With the use of polymeric MDI, MDI and other aromatic polyisocyanates in place of tolylene diisocyanate, there is a great improvement in the flame-retardant properties with more char formation and self-extending properties except in the very light, flexible foams. They are slower burning and less smoke is produced. Other flame-retardant must also be added to make the light, flexible foams self-extinguishing. With an increase in the amount of basic compound as filler, there is a further improvement in the flame-retardant properties.

EXAMPLE 4

Example 1 is modified wherein the polyol is replaced with a polyol listed below:
(a) polypropylene triol, mol. wt. 3,000, hydroxyl No. 42;
(b) polypropylene triol, mol. wt. 3,500, hydroxyl No. 49;
(c) poly(oxyalkylene)triol, mol. wt. 3,000, hydroxyl No. 58;
(d) poly(oxyalkylene)triol, mol. wt. 3,500, hydroxyl No. 49;
(e) poly(oxyalkylene)triol, mol. wt. 4,800, hydroxyl No. 35;
(f) polypropylene diol, mol. wt. 1,275, hydroxyl No. 88;
(g) polypropylene diol, mol. wt. 2,000, hydroxyl No. 56.

EXAMPLE 5

Example 1 is modified where different amounts of phosphoric acid are used, selected from the list below:
(a) 3 parts by weight;
(b) 5 parts by weight;
(c) 7 parts by weight;
(d) 10 parts by weight;
(e) 20 parts by weight.

EXAMPLE 6

About 15 parts by weight of an aqueous solution containing 50 percent phosphoric acid, 30 parts by weight of sodium carbonate and a polypropylene triol with hydroxyl No. 620 and viscosity, CPS at 25° C.–75° C. are mixed and reacted. Carbon dioxide is produced in the reaction and released, thereby producing a stable emulsion of sodium phosphate and polyol. To the emulsion, 1 part by weight of a foam regulator (Dow 193), 0.25 parts by weight of tin octoate, 1 part by weight of an amine catalyst (DABCO-8,020 by Air Products) and 5 parts by weight of trichloromonofluoromethane are added, then mixed and agitated with 120 parts by weight of Polymeric MDI (PAPI 27 by UPJOHN). The mixture expands into a semi-flexible foam of about 2 pounds per cubic foot.

On flame-testing, the foam is self-extinguishing within 5 seconds after the flame is removed. A char is formed and the flame goes out.

EXAMPLE 7

Example 6 is modified wherein another powdered basic salt-forming compound is utilized in place of 50 percent by weight of sodium carbonate and is selected from the list below:
(a) strontianite powder ($SrCO_3$);
(b) witherite (Ba $CO_3$);
(c) meerschalim (hydrated magnesium silicate;

(d) zeolite;
(e) Beryllium hydroxide;
(f) rinic oxide;
(g) zinc;
(h) felspar;
(i) stannous hydroxide;
(j) lead hydroxide;
(k) lead carbonate;
(l) siderite ($FeCO_3$);
(m) cobalt hydroxide;
(n) nickel hydroxide;
(o) nickel carbonate;
(p) potassium carbonate;
(q) asbestos;
(r) mica;
(s) calcium carbonate;
(t) natolite ($Na_2Al_2Si_3O_{10}$);
(u) willemite ($Zn_2SiO_4$);
(v) calcium oxide;
(w) wollastonite ($CaSiO_3$);
(x) talc;
(y) tin;
(z) mixtures of the above.

EXAMPLE 8

Example 6 is modified wherein another triol or diol is used in place of the polypropylene triol and is selected from the list below:
(a) polypropylene triol, viscosity 750, hydroxyl No. 620;
(b) polypropylene triol, viscosity 241, hydroxyl No. 168;
(c) polypropylene triol, viscosity 270, hydroxyl No. 232;
(d) polypropylene triol, viscosity 310, hydroxyl No. 112;
(e) ethylene oxide/propylene oxide polyol, viscosity 857, hydroxyl No. 335.

EXAMPLE 9

Example 6 is modified wherein various amounts of phosphoric acid are used and the amount is selected from the amounts below:
(a) 3 parts by weight;
(b) 5 parts by weight;
(c) 8 parts by weight;
(d) 12 parts by weight;
(e) 20 parts by weight.

EXAMPLE 10

About 15 parts by weight of an aqueous solution containing 50 percent phosphoric acid, 20 parts by weight of aluminum hydroxide powder, and 100 parts by weight of a poly(oxyalkylene) polyol, viscosity 550, hydroxyl No. 380, are mixed and reacted, thereby producing an emulsion of aluminum phosphate in the polyol. About 1 part by weight of foam regulator (DOW 1931), 0.25 parts by weight of tertiary amine (DABCOR 8020), 0.25 parts by weight of tinoctoate and 5 parts by weight of trichloromonofluoromethane are admixed with the emulsion, then admixed with 1.25 parts by weight of Polymeric MDI (MONDUR MR by MOBAY). The mixture expands to produce a rigid foam of about 2 pounds per cubic foot.

This foam has good flame-retardation properties, self-extinguishing, chars and won't burn any further. This foam was retested after 6 months and the foam was self-extinguishing. The flame would go out within 5 seconds after the flame was removed or after a char was formed with the flame still in place.

EXAMPLE 11

Example 10 is modified wherein the aluminum hydroxide is replaced by a compound listed below:
(a) calcium;
(b) ammonium acetate;
(c) calcium acetate;
(d) sodium acetate;
(e) sodium;
(f) bismuth carbonate;
(g) potassium;
(h) potassium acetate;
(i) potassium citrate;
(j) lithium carbonate;
(k) barium oxide;
(l) zinc hydroxide;
(m) aluminium;
(n) magnesium;
(o) tin-acetate;
(p) lead;
(q) nickel carbonate;
(r) iron oxide;
(s) lead acetate;
(t) pyrolusite ($MnO_2$);
(u) sodium tungstate;
(v) sodium manganate;
(w) cobalt hydroxide;
(x) nickel hydroxide;
(y) mixtures of the above.

EXAMPLE 12

Example 10 is modified wherein a different polyol is used and is selected from the list below, and potassium hydroxide is added as needed to adjust the pH:
(a) Sucrose polyether polyol, hydroxyl No. 380;
(b) Sucrose amine polyol, hydroxyl No. 413;
(c) phenyl amine polyol, hydroxyl No. 350;
(d) poly(oxyalkylene)polyol, hydroxyl No. 380;
(e) polyester polyol, hydroxyl No. 275;
(f) aromatic polyester polyol, hydroxyl No. 405;
(g) chlorinated polyhydroxypolyether, hydroxyl No. 193;
(h) methyl glycoside-based polyol, hydroxyl No. 240;
(i) phenol-formaldehyde resin, hydroxyl No. 140;
(j) phenolyl-formaldehyde resin with furfuryl alcohol and melamine, hydroxyl No. 140;
(k) polyethylene oxide, monoalcohol with mol. wt. 782;
(l) urea-formaldehyde resin polyol 120;
(m) aromatic polyol, hydroxyl No. 375;
(n) amine polyol, hydroxyl No. 475;
(o) sorbitol-based polyol, hydroxyl No. 490;
(p) polypropylene polyol with urea, hydroxyl No. 380;
(q) phosphorus-containing polyol(VIRCOL-82 by MOBIL) hydroxyl No. 205;
(r) mixtures of the above.

EXAMPLE 13

Example 10 is modified wherein the amount of aqueous solution of phosphoric acid used is selected from the list below:
(a) 3 parts by weight;
(b) 7 parts by weight;
(c) 12 parts by weight;
(d) 20 parts by weight.

EXAMPLE 14

About 15 parts by weight of an aqueous solution containing 50 percent phosphoric acid and 20 parts by weight of calcium carbonate powder are admixed with 100 parts by weight of tolylene diisocyanate (TDI by Olin). The mixture reacts and produces a tolylene diisocyanate prepolymer containing calcium phosphate. About 40 parts by weight of this prepolymer are used in place of the TDI in Example 1, thereby producing a flame-retardant polyurethane flexible foam.

EXAMPLE 15

About 10 parts by weight of an aqueous solution containing 50 percent phosphoric acid and 20 parts by weight of calcium carbonate powder are admixed with 100 parts by weight of a polyisocyanate selected from the list below and reacted, thereby producing a polyisocyanate prepolymer containing calcium phosphate:
- (a) tolylene diisocyanate (TDI 180 by Olin);
- (b) hexamethylene-1,6-diisocyanate;
- (c) Polymeric MDI (MONDUR MR by MOBAY);
- (d) methylene diphenyl isocyanate;
- (e) Polymeric MDI (PAPI 27 by UPJOHN);
- (f) tolylene-2,4-diisocyanate;
- (g) modified polyisocyanate (MONDUR T-422 by MOBAY).

EXAMPLE 16

Example 15 is modified wherein the amount of phosphoric acid is selected from the list below:
- (a) 3 parts by weight;
- (b) 5 parts by weight;
- (c) 15 parts by weight.

EXAMPLE 17

Example 15 is modified wherein 5 parts by weight of a polyol are added with the phosphoric acid and selected from the list below:
- (a) ethylene glycol;
- (b) diethylene glycol;
- (c) propylene glycol;
- (d) urea;
- (e) dipropylene glycol;
- (f) triethylene glycol;
- (g) tripropylene glycol.

EXAMPLE 18

Example 15 is modified wherein the polyisocyanate prepolymer containing calcium phosphate is reacted with 50 parts by weight of a polyol selected from the list below, thereby producing a flame-retardant polyurethane product:
- (a) polypropylene triol, mol. wt. 3,000, hydroxyl No. 56;
- (b) poly(oxyalkylene)triol, mol. wt. 4,800, hydroxyl No. 35;
- (c) castor oil;
- (d) aromatic polyester polyol, hydroxyl No. 350;
- (e) ethylene oxide/propylene oxide polyol, hydroxyl No. 58;
- (f) polypropylene diol, viscosity 93, hydroxyl No. 28;
- (g) aromatic amine polyol, viscosity 14,000, hydroxyl No. 530;
- (h) poly(oxyalkylene)polyol, hydroxyl No. 350;
- (i) hydroxy-terminated homopolymer of butadiene, hydroxyl No. 46.6, mol. wt. 2,800 (Poly bd R-45HT by Arco);
- (j) Caprolactone diol, mol. wt. 2,000, hydroxyl No. 56;
- (k) sucrose polyol, viscosity 30,000, hydroxyl No. 470;
- (l) polyester resin, viscosity 8,000, hydroxyl No. 210;
- (m) polyurea-filled polyol, viscosity 3,200, hydroxyl No. 28;
- (n) mixtures of the above.

The foam was flame-tested and it was self-extinguishing. The flame went out within 5 seconds after the flame was removed or on char formation.

EXAMPLE 19

Example 15 is modified wherein the polyisocyanate prepolymer is reacted with 60 parts by weight of the polyol-containing aluminium phosphate, freon and DOW 193, thereby producing a rigid foam of about 2 pounds per cubic foot. The foam is self-extinguishing within 5 seconds when flame-tested.

EXAMPLE 20

Example 6 is modified wherein 50 percent of the phosphoric acid is replaced with a concentrated aqueous halogen acid solution which was selected from the list below:
- (a) hydrochloric acid;
- (b) hydrofluoric acid;
- (c) hydrobromide acid;
- (d) hydriodic acid.

The foamed products were flame-tested and the foams were self-extinguished within 5 seconds after the propane flame was removed.

EXAMPLE 21

About 10 parts by weight of concentrated hydrochloric acid, 30 parts by weight of aluminium hydroxide powder and 100 parts by weight of polypropylene polyol, viscosity 550, hydroxyl No. 380, are mixed and reacted. In about 4 hours, 1 part by weight of a foam regulator (DOW 193), 0.25 parts by weight of tin-oleate and 0.5 parts by weight of amine catalyst (DAB Co R 8020 by AIR PRODUCTS) and 5 parts by weight of trichloromonofluoromethane were admixed with the polyol-aluminium chloride suspension, then mixed with 120 parts by weight of Polymeric MDI (PAPI 27 by UPJOHN). The mixture expanded and hardened into a rigid foam of about 2.5 pounds per cubic foot. The foam was flame-tested and it slowly burned, then formed a char and was self-extinguishing.

EXAMPLE 22

Example 15 is modified wherein another basic salt-forming compound is used in place of calcium carbonate and selected from the list below:
- (a) calcium oxide;
- (b) calcium hydroxide;
- (c) sodium hydroxide;
- (d) sodium carbonate;
- (e) potassium carbonate;
- (f) potassium hydroxide;
- (g) sodium silicate;
- (h) potassium silicate;
- (i) clay;
- (j) talc;
- (k) Portland cement;
- (l) felspar;
- (m) antimony trioxide;
- (n) arsenic oxide;

(o) sodium adipate;
(p) potassium oxolate;
(q) aluminium hydroxide;
(r) ammonium carbonate;
(s) sodium borate;
(t) titanium trioxide;
(u) zirconium oxide;
(v) lithium carbonate;
(w) bauxite;
(x) codazzite (Ca, Mg, Fe, Ce)CO$_3$;
(y) mixtures of the above.

EXAMPLE 23

Comparison flame-retardant studies were done, comparing the foam produced in Example 10 with foam produced by first reacting the phosphoric acid and basic compounds to produce a salt, then adding the salt to the polyol before reacting with the polyisocyanate. The salts produced in Examples 10 and 11 were used:

| basic compound | salt formed in polyol | salt formed before adding to polyol |
|---|---|---|
| aluminium hydroxyl | self-extinguishing | burns |
| calcium | self-extinguishing | burns |
| calcium acetate | self-extinguishing | burns |
| sodium acetate | self-extinguishing | burns |
| sodium | self-extinguishing | burns |
| bismuth carbonate | self-extinguishing | burns |
| potassium | self-extinguishing | burns |
| potassium acetate | self-extinguishing | burns |
| potassium citrate | self-extinguishing | burns |
| lithium carbonate | self-extinguishing | burns |
| barium oxide | self-extinguishing | burns |
| zinc hydroxide | self-extinguishing | burns |
| aluminum | self-extinguishing | burns |
| magnesium | self-extinguishing | burns |
| tin acetate | self-extinguishing | burns |
| iron oxide | self-extinguishing | burns |
| lead acetate | self-extinguishing | burns |
| pyrolusite | self-extinguishing | burns |
| sodium tongstate | self-extinguishing | burns |
| sodium manganate | self-extinguishing | burns |
| cobalt hydroxide | self-extinguishing | burns |
| nickel hydroxide | self-extinguishing | burns |

EXAMPLE 24

Example 23 was modified wherein 3 times (45 parts by weight of the phosphoric acid) as much of the salt produced outside the polyol was used, compared to the amount of salt produced in the polyol in Example 10 and the foam produced from the salt produced outside the polyol, then added to the polyol. This was reacted with the polyisocyanate, thereby producing rigid polyurethane foam. The foam was flame-tested and it burned as it did in Example 23.

EXAMPLE 25

Example 6 is modified wherein a phosphorus-containing compound is used in place of phosphoric acid and selected from the group listed below:
(a) phosphinic acid;
(b) phosphonic acid;
(c) phosphonous acid;
(d) phosphinous acid;
(e) phosphine oxide;
(f) phosphorus trichloride;
(g) phenyl acid phosphate;
(h) methyl chlorophine;
(i) phosphorus oxychloride;
(j) monoaluminum phosphate;
(k) sodium dihydrogen phosphate;
(l) mixtures of the above.

EXAMPLE 26

Example 6 is modified wherein 10 parts by weight of a modifying compound are are added to the polyol and selected from the list below:
(a) styrene oxide;
(b) polyepoxy resin;
(c) polyester resin with methyl ethyl ketone peroxide;
(d) styrene with catalytic amount of potassium persulfate;
(e) isoprene with catalytic amount of potassium persulfate;
(f) melamine;
(g) phenoplast;
(h) aminoplast;
(i) cellulose powder;
(j) acetone;
(k) sodium silicate powder;
(l) fumed silica powder;
(m) perchloroethylene;
(n) polyester benzoate;
(o) gypsum powder;
(p) precipitated silica powder;
(q) polyepichlorohydrin polymer;
(r) vinyl acetate polymer;
(s) triallyl cyanurate;
(t) furfural-ketone resin;
(u) polysulfide polymer;
(v) furaldehyde;
(w) mixtures of the above.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the Art upon reading my disclosure. These are intended to be included within the scope of my invention, as defined in the appended claims.

I claim:

1. The process of preparing a flame retardant foamed polyurethane products which process comprises of mixing and reacting:
   (A) A salt-forming basic compound selected from the group consisting of alkali metal compounds selected from the group consisting of compounds containing sodium, potassium, lithium, rubidium, cesium and mixtures thereof, except for alkali metal sulfate compounds, alkali metal halide compounds and alkali metal, alkaline earth metal compounds selected form the group consisting of compounds containing calcium, magnesium, barium, strontium and mixtures thereof, except for alkaline earth metal sulfate, alkaline earth metal halides and alkaline earth metal nitrates, metal compounds selected from the group consisting of compounds containing beryllium, copper, zinc, aluminum, tin, titanium, zirconium, lead, arsenic, antimony, bismuth, molybdenum, tungsten, manganese, iron, nickel, cobalt and mixtures thereof, except for metal sulfates, and metal halide and metal nitrates, ammonia compounds selected form the group consisting of ammonia, ammonium carbonate, amino compounds, amines, ammonia salts of organic acid, quaternary ammonium hydroxides, ammonium silicate and mixtures thereof except for ammonium salts of sulfuric acid, nitric acid and acid halides and mixtures thereof in the amount of 1 to 300 parts by weight;

(B) salt-forming acidic compounds selected from the group consisting of phosphorous-containing compounds, halogen-containing compounds, and mixtures thereof in the amount of 1 to 100 parts by weight;

(C) compound containing one or more active hydrogen that will react with a polyisocyanate compound in the amount of 1 to 200 parts by weight;

(D) compounds containing at least two isocyanate groups in the amount of 50 to 100 parts by weight, the said mixing will be carried out in such a way that components (A) and (B) are reacted in (C) or (D) or in both (C) and (D) before (C) and (D) are reacted, (E) up to 50 percent by weight of an inert liquid, boiling in the range of $-25°$ C. to $80°$ C., is included in the reaction mixture as blowing agent and the reaction proceeds with concomitant foaming.

2. The process of claim 1 wherein the compound containing at least one active hydrogen that will react with a polyisocyanate compound is selected from the group consisting of monohydroxy compounds, polyhydroxy compounds, amines, silicone polyols, amino compounds, compounds containing thiol groups, compounds containing carboxyl groups and mixtures thereof.

3. The process of claim 1 wherein the compounds containing at least two isocyanate groups are selected from the group consisting of aliphatic, cycloaliphatic, araliphatic, aromatic and heterocyclic polyisocyanates and mixtures thereof.

4. The process of claim 1 wherein the phosphorous-containing compound is selected from the group consisting of phosphoric acid, phosphinic acid, phosphonic acid, phosphonous acid, phosphinous acid, phosphine oxide, phosphorus trichloride, alkylchlorophosphines, organic acid phosphates, phosphorus oxychloride, monoaluminum phosphate, hydrogen-containing salts of phosphoric acid, hypophosphorous acid and mixtures thereof.

5. The process of claim 1 wherein the halogen-containing compound is selected from the group consisting of hydrochloric acid, hydrofluoric acid, hydrobromide acid, hydroiodic acid, chlorine, bromide, alkylating agents containing halides, hydrogen chloride, hydrogen bromide, and mixtures thereof.

6. The process of claim 1 wherein up to 10 percent by weight of activator is included in the reaction mixture.

7. The process of claim 1 wherein up to 20 percent by weight of foam stabilizer is included in the reaction mixture.

8. The process of claim 1, wherein up to 20 percent by weight of emulsifying agent is included in the reaction mixture.

9. The process of claim 1, wherein an inorganic or organic particulate or pulverulent material is included in the reaction mixture.

10. The product produced by the process of claim 1.

11. The product produced by the process of claim 10.

12. The process of claim 1 wherein up to 300 percent by weight of a modifying compound is added to the reaction mixture.

* * * * *